A. G. FELLOWS.
Mallet.
No. 165,221.
Patented July 6, 1875.
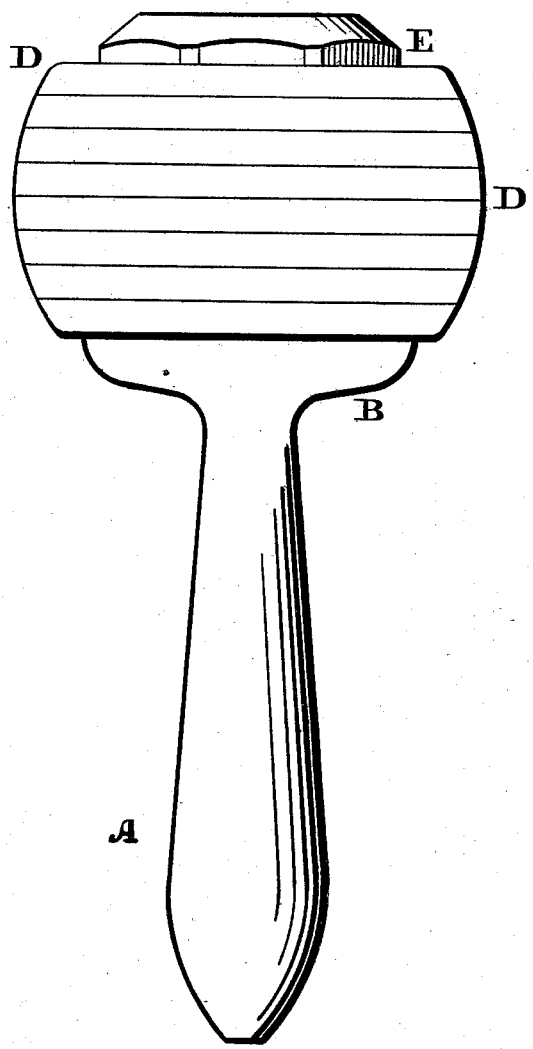
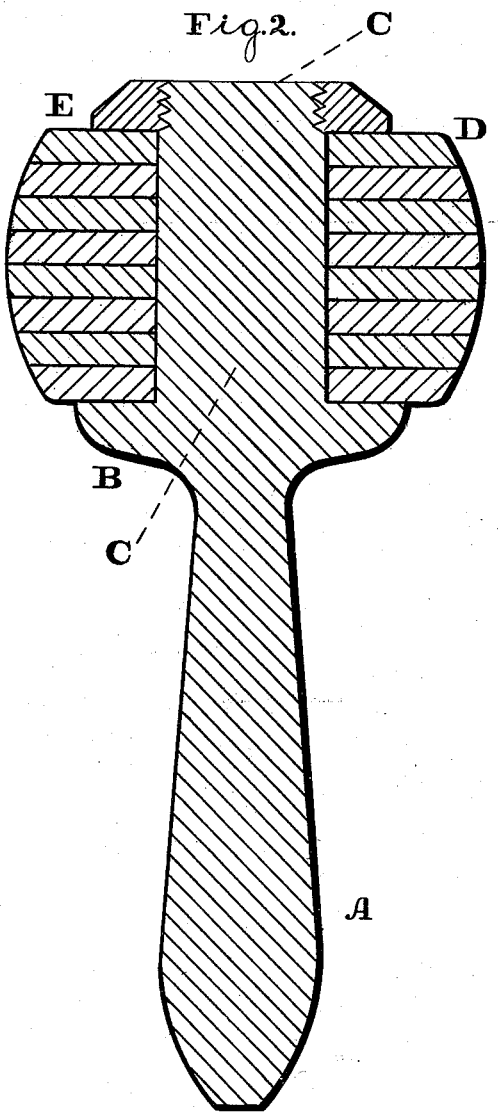

UNITED STATES PATENT OFFICE.

ALBERT G. FELLOWS, OF PHILADELPHIA, PENNSYLVANIA.

IMPROVEMENT IN MALLETS.

Specification forming part of Letters Patent No. 165,221, dated July 6, 1875; application filed May 14, 1875.

*To all whom it may concern:*

Be it known that I, ALBERT G. FELLOWS, of the city and county of Philadelphia, and State of Pennsylvania, have invented a new and useful Improvement in Mallets; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a side elevation of the device embodying my invention. Fig. 2 is a central longitudinal section thereof.

Similar letters of reference indicate corresponding parts in the two figures.

My invention consists of a metallic handle, formed with a collar and shank and a series of disks, which are fitted on the shank, and clamped between the collar and a nut on the end of the shank, whereby there is produced a mallet which is strong and compact, and of small compass, and in which the balance and weight may be readily adjusted by alterations in the dimensions of the shank of the handle.

Referring to the drawings, A represents a metallic handle, with which are formed in one piece a collar, B, and a shank, C. D represents a series of disks, which are placed parallel to each other on the shank C against the collar B, and the end of the shank is threaded for the reception of a clamping-nut, D, so that the collar is on one side of the series of disks, and the nut E on the other side thereof.

The disks are constructed of prepared paper, or other suitable material that possesses toughness with elasticity and compactness, without liability to fracture or cracking, and an opening is made in the disks for the passage of the shank C.

The series of disks form the head of the mallet, and are clamped in position on the shank between the collar B and nut D, so as to constitute, as it were, an integral mass, the surface of which may be turned or otherwise worked, so as to be properly faced for the purpose intended.

It will be seen that there are but few parts in completing the mallet, and the implement is strong and serviceable, may be wielded with great power, the exertion therefor being less, occupies a small compass, and, owing to the few joints existing, the weakness otherwise caused by joints is prevented.

The balance and weight of the mallet may be nicely regulated or adjusted by forming the shank C with an enlarged or diminished diameter relatively to the requirements of the case; but the shank will always have a diameter sufficiently large to withstand the severe usage to which the implement is subjected, hence possessing the requisite strength and rendering efficient service.

I disclaim the Letters Patent No. 127,363, granted to Allen Partridge May 28, 1872.

Having thus described my invention, what I claim as new, and desire to secure by Letters Patent, is—

The handle A with shank C and collar B intermediate thereof, all formed in one piece of metal, in combination with the series of disks D and the clamping-nut E at the outer end of the shank, all constructed to operate substantially as and for the purpose set forth.

ALBERT G. FELLOWS.

Witnesses:
JOHN A. WIEDERSHEIM,
ALBERT H. HOECKLEY.